United States Patent [19]

Schultz

[11] 4,018,323
[45] Apr. 19, 1977

[54] BACKSTACKING APPARATUS

[76] Inventor: Edward D. Schultz, 2306 Cherry Ridge Lane, Brandon, Fla. 33511

[22] Filed: June 19, 1975

[21] Appl. No.: 588,423

[52] U.S. Cl. .................................. 198/508; 214/10
[51] Int. Cl.² ........................................ B65G 65/28
[58] Field of Search ................ 214/10, 9, 16 R; 198/36

[56] References Cited

UNITED STATES PATENTS

| 3,487,910 | 1/1970 | Strocker et al. | 198/36 |
| 3,509,985 | 5/1970 | Fischer | 198/36 |
| 3,618,744 | 11/1971 | Hulette | 198/36 |

Primary Examiner—Stanley H. Tollberg
Attorney, Agent, or Firm—Arthur W. Fisher, III

[57] ABSTRACT

A backstacking apparatus for stacking and reclaiming bulk particulate material comprising a particulate handling and movable positioning structure. The particulate handling structure includes a boom comprising a first and second boom member having a rake and rake drive operatively mounted thereon. The movable positioning structure includes a base supported on a pair of substantially parallel rails by rollers or wheels disposed on opposite sides thereof to control the horizontal movement of the particulate handling structure relative to the supporting surface and boom hoist coupled between the base and the boom to control the vertical movement of the particulate handling structure relative to the supporting surface.

9 Claims, 6 Drawing Figures

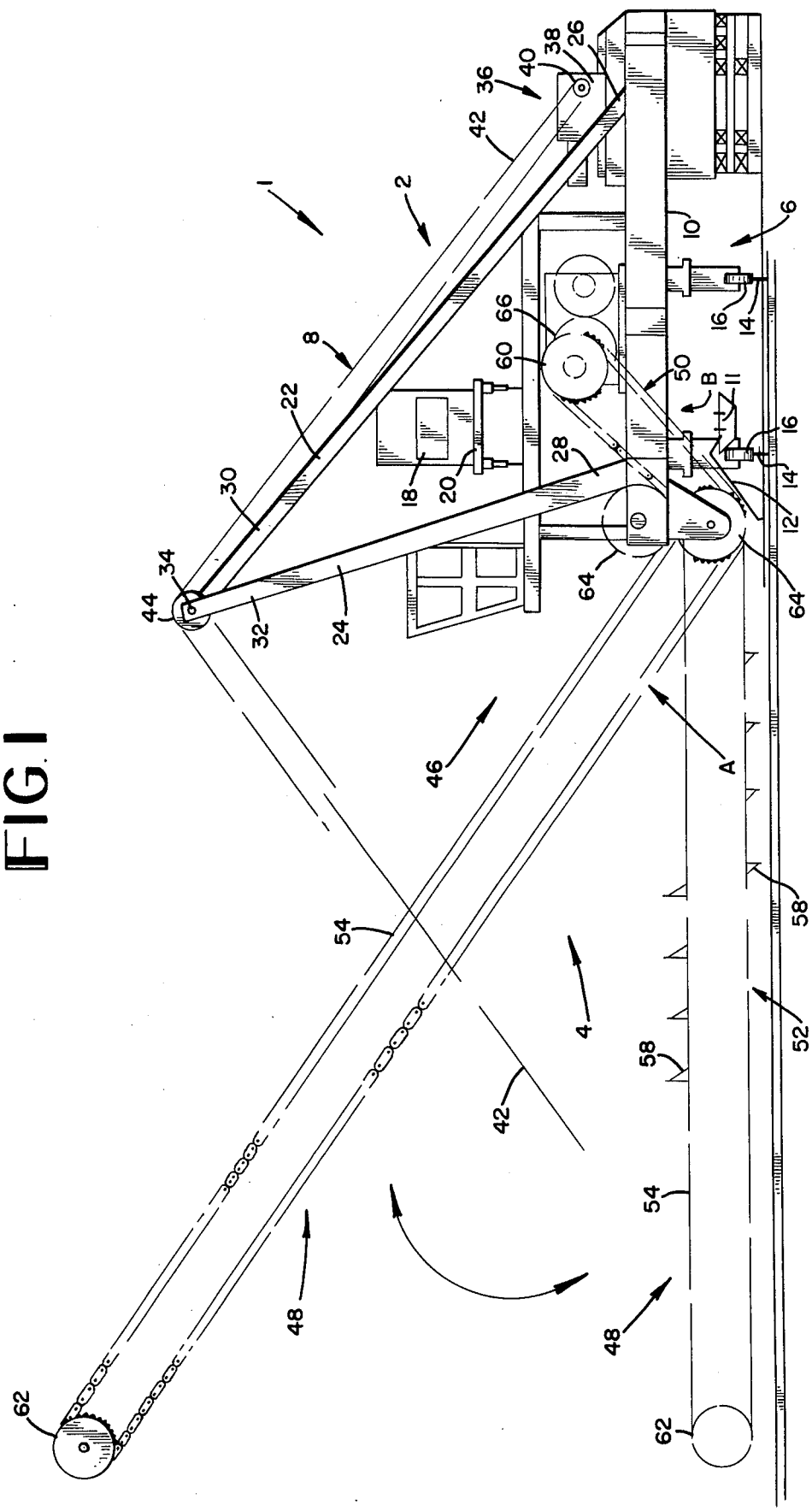

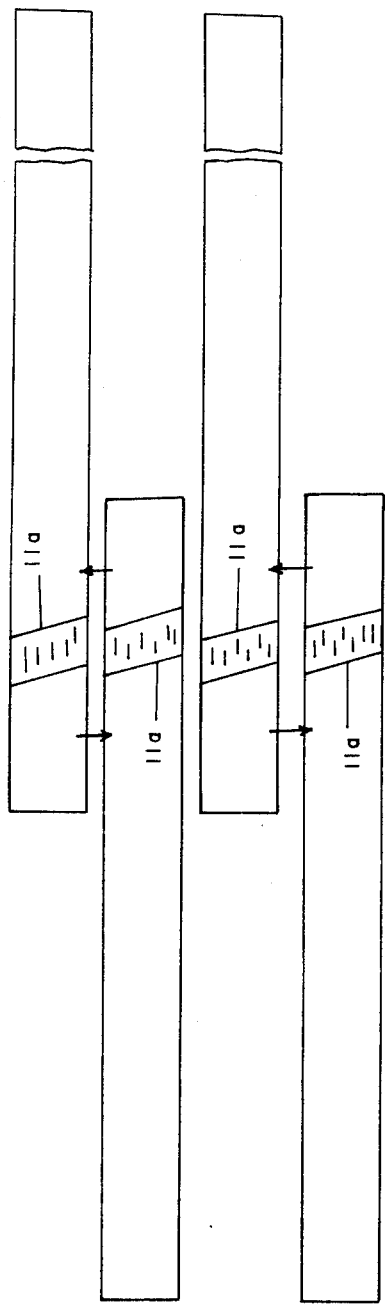
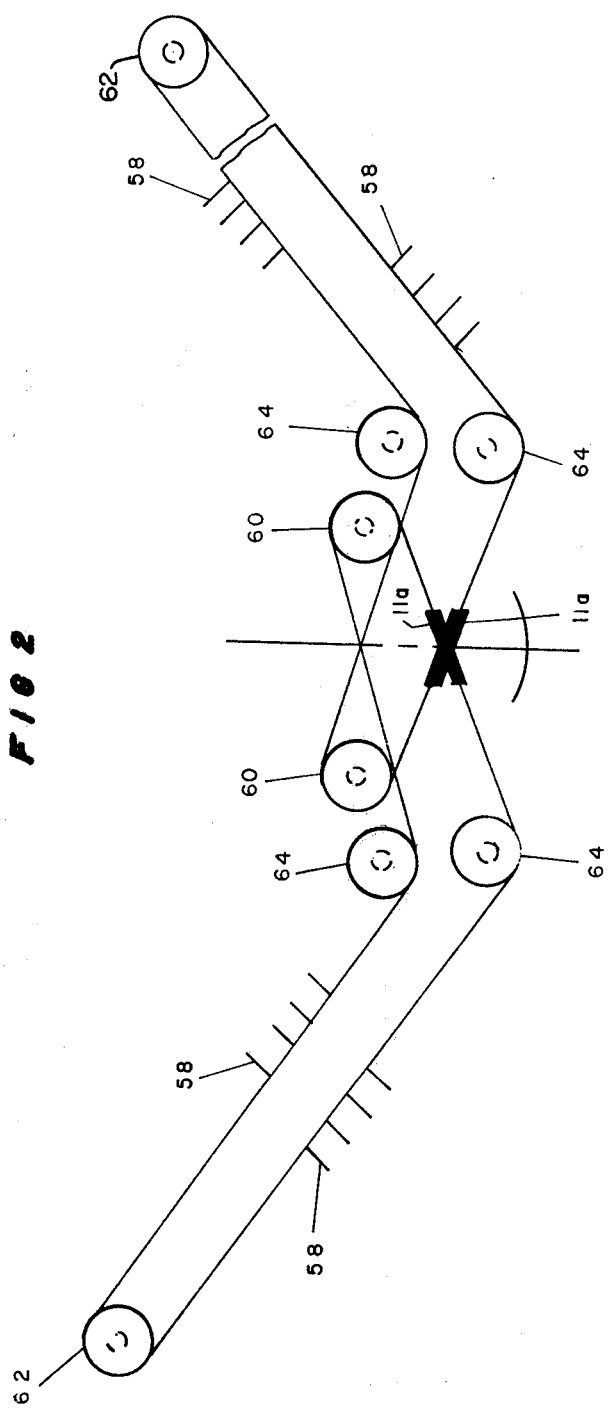

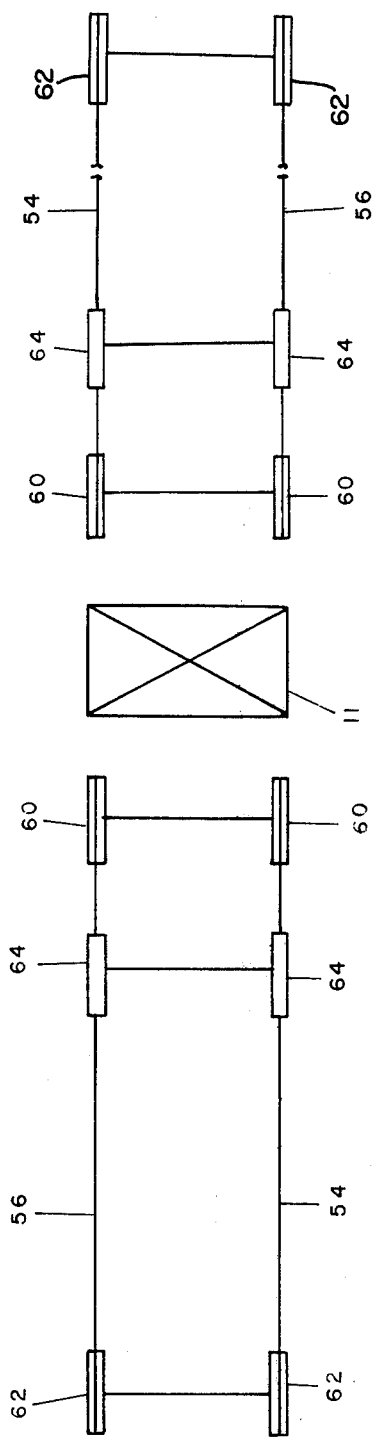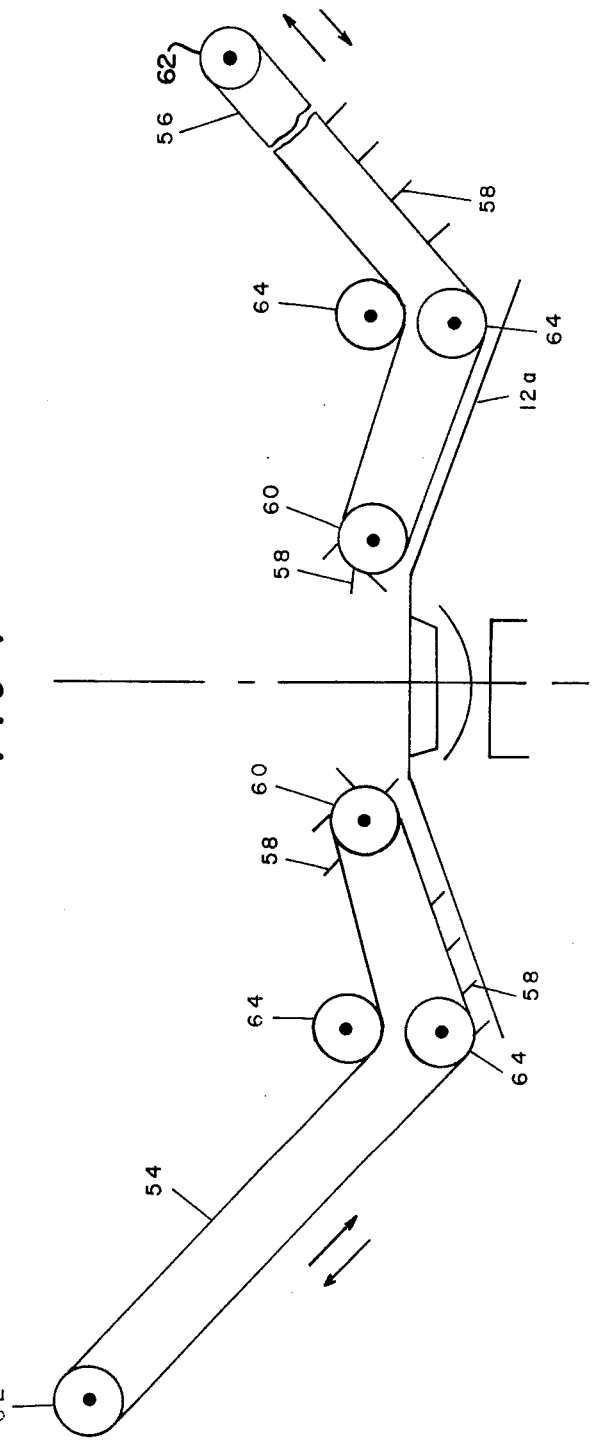
FIG. 4
FIG. 5

BACKSTACKING APPARATUS

BACKGROUND OF THE INVENTION

1. Field of the Invention

A backstacking apparatus for stacking and reclaiming bulk particulate material comprising a particulate handling means and moveable positioning means.

2. Description of the Prior Art

A large number of devices of various construction for stacking and reclaiming bulk material in piles is well known. Ofter such devices include separate loading or stacking apparatus and reclaiming or scrapping structures. One such device includes scrappers mounted on a traveling frame such as a gantry. The scrappers are tiltable thus permitting both vertical and horizontal adjustment relative to the stacking or storage zone. This structure may include a vertical center post usually arranged in the center of the storage zone with the removal scrapper pivotally mounted on the base or center post for reclaiming. The removal or reclaiming operation permits the scrapper boom to be lowered onto the slope of the pile scrapping the bulk material from the slope downward carrying it to a funnel-shaped opening in the support surface in the center of the pile. The disadvantage of such devices is readily apparent since the effective storage volume is relatively small in proportion to the required floor area in the enclosed space for the pile.

Recent examples of particulate handling apparatus include combination stacking and reclaiming structure in an integrated, unitary system. Such devices commonly feature a conveyor feed means for carrying the particulate material to the storage zone and a rake-like reclaiming structure operatively coupled to a boom for reclaiming the stored particulate material. As with the previously described structure, the storage capacity is relatively smaller in porportion to the required floor area due to the buildup of the storage particulate material away from the base of the boom. In addition, the initial cost of the conveyor feed means along with the operational expense and replacement cost are substantial.

Thus, it is obvious that a combined reclaiming apparatus without the necessity of the conveyor feed means would greatly enhance the operational realiability and reduce the initial cost and operational expense of such particulate handling apparatus. In addition, a device increasing greatly the storage volume in porportion to the floor space would greatly reduce the cost of such particulate handling.

SUMMARY OF THE INVENTION

The present invention relates to a backstacking apparatus for stacking and reclaiming bulk particulate material. More specifically the backstacking apparatus comprises a particulate handling means mounted on a movable positioning means.

The particulate handling means includes a boom means comprising a first and second boom member having a rake means and rake drive means operatively mounted thereon. The second boom member is fixedly attached to the movable positioning means while the inner end of the first boom member is pivotally attached to the movable positioning means to permit vertical adjustment of the boom means relative to the supporting surface as more fully described hereinafter. The rake means includes a pair of endless chain means operatively mounted on the boom means in substantially parallel spaced relation by the rake drive means and at least one rake blade extending between corresponding points of the endless chain means. The rake drive means includes at least two pair of chain sprockets rotatably mounted in fixed spaced relation on boom means. The chain sprockets are disposed to engage the endless chain means. At least one pair of sprockets are attached to a drive means operable in either a forward or reverse mode to stack or reclaim particulate material as more fully described hereinafter. The rake drive means may further include one or more pair of hold down chain sprockets disposed to engage the endless chain means and retain same on the boom means.

The movable positioning means includes a base supported on a pair of substantially parallel rails by roller means disposed on opposite sides thereof to control the horizontal movement of the particulate handling means relative to the supporting surface and and boom hoist means coupled between the base and the boom means to control the vertical movement of the particulate handling means relative to the supporting surface. A feed hopper having a two-position control gate attached thereon extends upwardly from the base to selectively control to the flow of particulate material to the storage zone or loading zone as more fully described hereinafter. The base comprises a substantially horizontal platform having a two-position loading gate in open communication with the feed hopper formed thereon. The boom hoist means comprises a first and second boom hoist member, attached to the platform at the lower ends thereof and interconnected to each other at the upper ends thereof, a boom hoist drive means mounted on the platform and a hoist cable interconnected between the boom hoist drive means and the boom means to adjust the vertical position thereof relative to the supporting surface.

In operation, particulate material is fed to the feed hopper where it is distributed to the storage zone when the control gate is in the first position and to the loading zone when the control gate is in the second position. The position of loading gate is coordinated with the control gate to feed particulate material to the storage zone when both gates are in the first position and to the loading zone when both gates are in the second position.

When storing or stacking, particulate material is fed from the feed hopper to the storage zone where the rake means driven in the forward or stacking direction engages the upper surface of the particulate material to draw the material outwardly relative to the base. As the material builds up relative to the supporting surface the base is moved horizontally on the rails to build up the pile evenly parallel to the rails. As the pile builds upwardly from the supporting surface, the boom means is adjusted upwardly by the boom hoist means to permit the pile to build upwardly.

To withdraw or reclaim, the loading gate is placed in the second position with the rake means driven in the second or reclaiming direction. As previously described horizontal and vertical position of the boom means is adjusted to keep the rake means in contact with the upper surface of the stacked particulate material. As the particulate material is drawn inwardly to the base, the particulate material is drawn onto the platform and loading zone by the rake means where it is fed through the loading gate to a conveyor or other suitable transport means for conveyance to a remote site.

With both the control gate and loading gate in the second position, particulate material may be fed directly from the feed hopper to the load zone for transport to a remote site.

It is thus apparent that this combination of elements provides an effective and efficient backstacking apparatus.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS for a fuller understanding of the nature and the objects of the invention, reference should be had to the following detailed description taken in connection with the accompanying drawings in which:

FIG. 1 is a side view of a backstacking apparatus.

FIG. 2 is a side view of an alternate embodiment of a backstacking apparatus.

FIG. 3 is a top view of the first alternate embodiment of the backstacking apparatus.

FIG. 4 is a side view of still another alternate embodiment of the backstacking apparatus.

FIG. 5 is a top view of the second alternate embodiment of the backstacking apparatus.

Similar reference characters refer to similar parts throughout the several views of the drawings.

DETAILED DESCRIPTION OF THE PREFERRED EMBODIMENT

Figure 6:
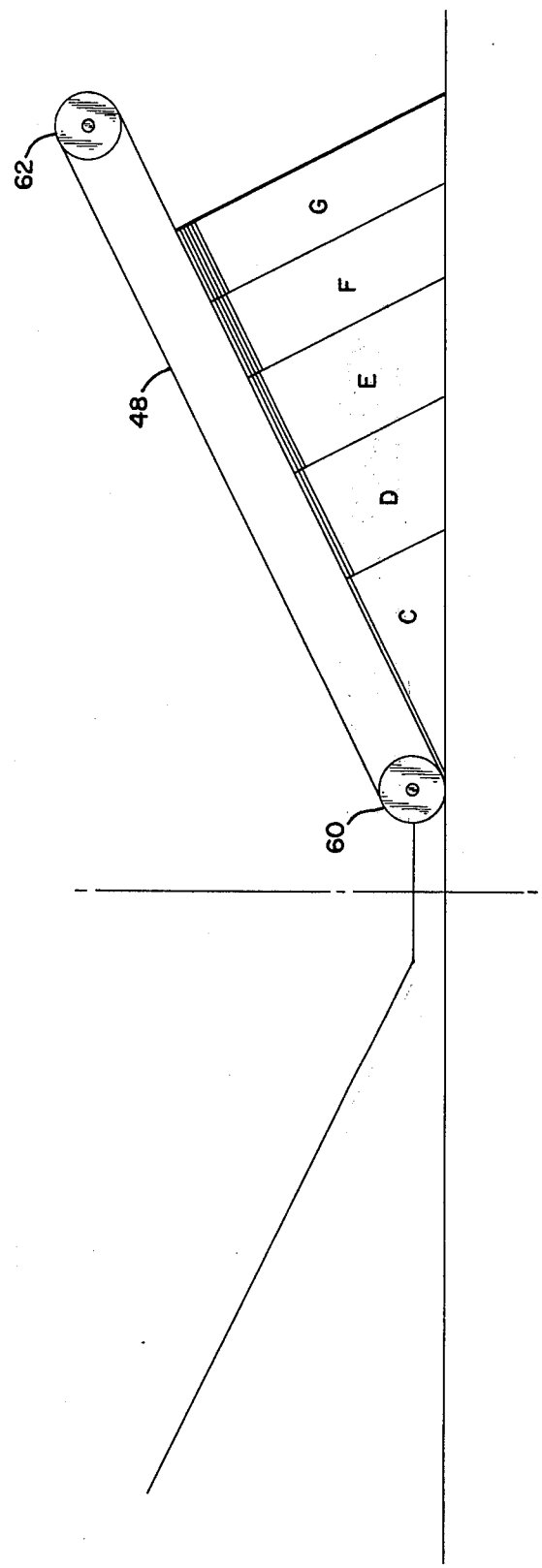
FIG. 6 is a side view of the stacking area showing zones of different particulate material for blending.

As best shown in FIG. 1 the backstacking apparatus generally indicated as 1 comprises a movable positioning means generally indicated as 2 and a particulate handling means generally indicated as 4 mounted thereon. The movable positioning means 2 comprises a base generally indicated as 6 having boom hoist means generally indicated as 8 operatively mounted thereon. The base 6 includes a substantially horizontal platform 10 having inclined loading plate 12, depending therefrom. The platform 10 is movably mounted on rails 14 disposed at opposite sides thereof by means of roller 16 operatively coupled to the lower portion of the platform 10. The platform 10 includes a two-position loading gate 11 in open communication with a feed hopper 18 formed thereon. The feed hopper 18 is attached to the upper portion of the platform 10. The feed hopper 18 includes control gate comprising element 20 movable between a first and second position to selectively control the flow of particulate material to the storage or stacking zone A when in the first position and the loading zone B when in the second position as more fully described hereinafter. Boom hoist means 8 comprises first and second boom hoist members 22 and 24 respectively attached at their respective lower ends 26 and 28 to the upper portion of the platform 10 and interconnected to each other at their upper portions 30 and 32 respectively at 34. Boom hoist means 8 further includes a boom hoist drive 36 including boom hoist drive means 38 and power cable reel 40. Operatively coupled to the power cable reel 40 is cable 42 extending the length of first boom hoist member 22 over roller 44 to the particulate handling means 4 to adjust the vertical position thereof relative to the supporting surface.

The particulate handling means 4 includes a boom means generally indicated as 46 comprising a first and second boom member 48 and 50 respectively having a rake means generally indicated as 52 and a rake drive means operatively mounted thereon. The second boom member 50 is fixedly attached to the upper surface of base 6 while the inner end of the first boom member 48 is pivotally attached to the base 6 to permit vertical adjustment of the boom means 46 relative to the supporting surface and more fully hereinafter described. The rake means 52 includes a pair of endless chain means 54 and 56 operatively mounted on the boom means 46 in substantially parallel spaced relation relative to each other by the rake drive means and at least one rake blade 58 extending between the corresponding points of the endless chain means 54 and 56. The rake drive means includes at least two pair of chain sprockets 60 and 62 mounted in fixed spaced relation on boom means 46. The chain sprockets 60 and 62 are disposed to engage the endless chain means 54 and 56 respectively. At least one pair of the chain sprockets 60 is attached to a drive means 66 which is operable in either the forward or stacking mode or reverse or loading mode to stack or reclaim particulate material as more fully described hereinafter. The rake drive means may further include one or more pair of hold down chain sprockets 64 disposed to engage the endless means 54 and 56 to retain same on the boom means 6.

FIGS. 2 and 3, and 4 and 5 show alternate embodiments wherein a pair of counter-opposing backstacking apparatus are combined to provide a unique blending operation as more fully described hereinafter. For purposes of description and reference similar elements are similarly designated. As shown FIGS. 2 and 3 disclose off set backstacking apparatus while FIGS. 4 and 5 show in line counter-opposing backstacking apparatus. In each of these alternate embodiments the platform includes a second inclined loading plate 12a disposed on the opposite side of the primary inclined loading plate 12 as previously described.

In operation, the particulate material is fed to the feed hopper 18 by some transportation means such as an endless conveyor belt where it is distributed to the storage or stacking area A when the control gate 20 is in the first position and to the loading zone B when the control gate 20 is in the second position. The position of the loading gate 11 is coordinated with the position of the control gate 20 to feed particulate material to the storage zone A when both gates are in the first position and to the loading zone B when both gates are in the second position. While in the second position the particulate material is permitted to fall directly through and onto the lower portion of the continuous endless conveyor belt or other proper transport means for removal to a remote site.

When sorting or stacking, particulate material is fed from the feed hopper 18 to the storage zone A where the rake means 52 driven in the forward or stacking direction engages the upper surface of the particulate material to draw the material outwardly relative to the base 6. As the material builds up relative to the supporting surface the base 6 is moved horizontally on the rails 14 to build up the pile evenly parallel to the rails 14. As the pile builds upwardly from the supporting surface, the boom means 46 is adjusted upwardly by the boom hoist means 8 to permit the pile to build upwardly.

To withdraw or reclaim, the loading gate 11 is placed in the second position with the rake means 52 driven in the second or reclaiming direction. As previously described horizontal and vertical position of the boom means 46 is adjusted to keep the rake means 52 is contact with the upper surface of the stacked particulate material. As the particulate material is drawn inwardly to the base 6, the particulate material is drawn onto the platform 10 and loading zone B by the rake means 52 where it is fed throught the loading gate 11 to conveyor or other suitable transport means for conveyance to a remote site.

This unique structure permits blending of particulate materials of varying grades and size. As best shown in FIG. 6, zones C, D, E, F and G represent quantities of particulate material of different qualities stacked at preselected rates. The relative volumes are strictly controlled which permits loading by the raking of equal volumes from the inclined top of the pile thus permitting fine blending in exacting proportions relative to the preselected stack rates of each individual zone.

Of course, the first boom member 48 may include an articulated extension to permit stocking at either horizontally or at a decreased angle. This articulated extension may incorporate a separate rake and rake drive means to permit independent stacking operation.

With reference to the blending operation of the apparatus 1 disclosed in FIGS. 2 and 3, loading gates 11a and 11b are closed permitting particulate material to be reclaimed from the first apparatus 1 drawn over the platform 10 to the storage zone A of the second backstacking apparatus 1 and accummulated as previously described. Due to the horizontal travel of the respective backstacking apparatus 1 relative to the pile, a continuous blending is accomplished. This is particularly useful where particulate material of varying sizes and grades are desired of being combined.

In the second alternate embodiment of FIGS. 4 and 5, the blending is accomplished by simply having the in-line backstacking apparatus 1 simultaneously reclaiming and stacking to permit the particulate material to be drawn over the first inclined loading plate 12 of the platform 10 onto and over the platform 10 and to the second backstacking apparatus 1 where it is stored or stacked as previously described.

Since this structure obviates the use of conveyor dropping during stacking, the dust pollution is reduced to a minimum In addition, this method of stacking avoids any dead space thus increasing the stacking volume to storage space ratio.

In this manner, an efficient, reliable backstacking apparatus is provided.

It is thus apparent that this combination of elements provides an effective and efficient backstacking apparatus.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A backstacking apparatus for stacking and reclaiming bulk particulate material comprising a particulate handling means operatively supported above a supporting surface by a movable positioning means, said particulate means comprising boom means including a first boom member configured to operatively support a rake means and rake drive means, said rake drive means coupled to said rake means to selectively move said rake means in a first or second direction relative to said first boom member, said rake means comprising a pair of substantially parallel spaced apart endless chain means including at least one blade element disposed between said pair of endless chain means, said rake drive means comprising at least one pair of sprocket means rotatably mounted on said first boom member, said endless chain means engaging said sprocket pair to drive said endless chains, said base means further including feed hopper means to supply particulate material to said backstacking apparatus, said feed hopper including a control means having a first and second position, said control means directing the particulate material to said storage zone when in said first position and to said loading zone when in said second position, said base means comprising a platform including a substantially horizontal element having a loading gate movable between first and second positions formed therein and a first inclined element extending outwardly therefrom to the stacking zone such that said rake means when operatively driven in the first direction moves particulate material outwardly from said base for stacking in a stacking zone and when said rake means is driven in said second direction the particulate material is drawn inwardly to said base to move said particulate material from the stacking zone through said loading gate when in said second position to a loading zone.

2. The backstacking apparatus of claim 1 further including a boom hoist means comprising a first boom hoist member attached to said base, a hoist drive means mounted on said base and a cable means interconnected between said hoist drive means and said boom means to control the vertical position of said boom means relative to the supporting surface.

3. The backstacking apparatus of claim 1 wherein said control means is disposed relative to said loading gate such that when said control means and said loading gate are in said second position particulate material is fed directly from said feed hopper to the loading zone.

4. The backstacking apparatus of claim 1 wherein said rake drive means further includes a second pair of sprocket means, said second pair of sprocket means rotatably mounted on said second boom member.

5. The backstacking apparatus of claim 1 wherein said boom means includes a second boom member, said second boom member fixedly attached to said base, said first boom member extending outwardly relative to said second boom member.

6. The backstacking apparatus of claim 5 wherein said rake drive means further includes at least one pair of idle sprockets pivotably mounted on said boom means to operatively engage said pair of endless chain means.

7. The backstacking apparatus of claim 2 wherein said boom hoist means includes a second boom hoist member attached between said base and said first boom hoist member.

8. The backstacking apparatus of claim 1 wherein said backstacking apparatus includes a pair of said backstacking apparatus disposed in an offset relationship relative to one another to permit simultaneous reclaiming and stacking operations to blend said particulate material.

9. The backstacking apparatus of claim 1 wherein said backstacking apparatus comprises a pair of said backstacking apparatus arranged in line relationship relative to one another to permit simultaneous reclaiming and stacking operations to blend said particulate material.

* * * * *